June 30, 1970  G. L. GREGOIRE  3,517,809
CENTRAL GRADING SYSTEM FOR CUT FLOWERS
Filed Dec. 3, 1968  2 Sheets-Sheet 1
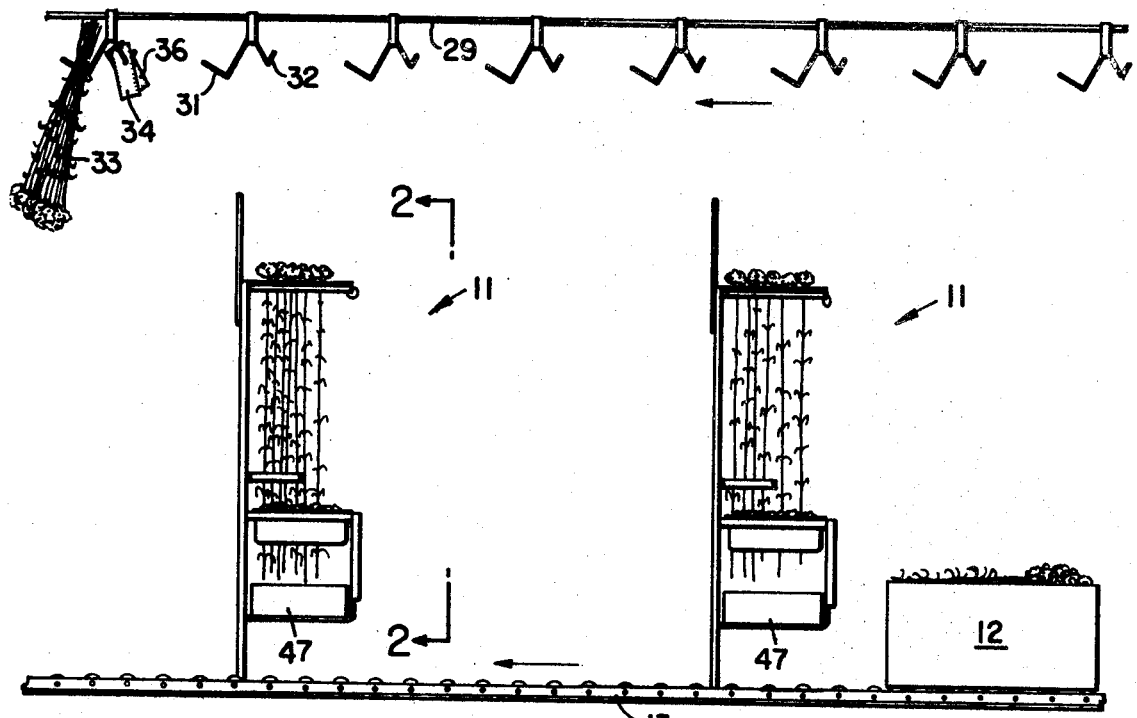
FIG_1
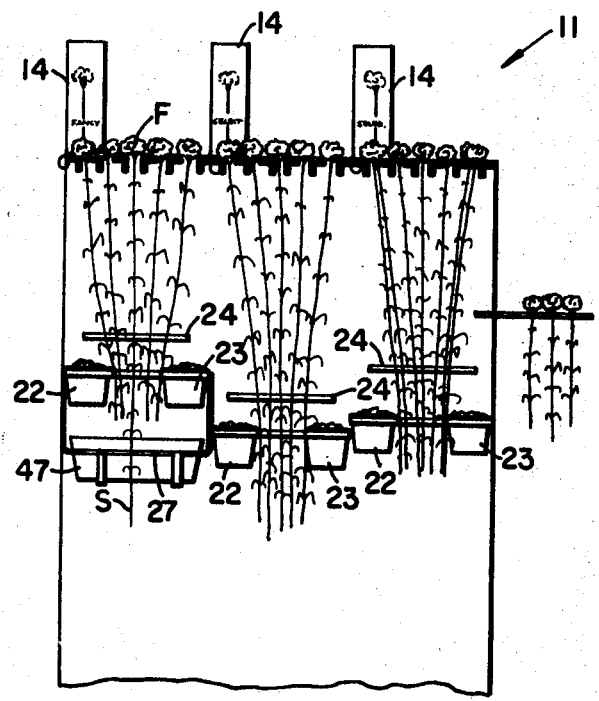
FIG_2
INVENTOR.
GERALD L. GREGOIRE
ATTORNEYS June 30, 1970   G. L. GREGOIRE   3,517,809
CENTRAL GRADING SYSTEM FOR CUT FLOWERS
Filed Dec. 3, 1968   2 Sheets-Sheet 2
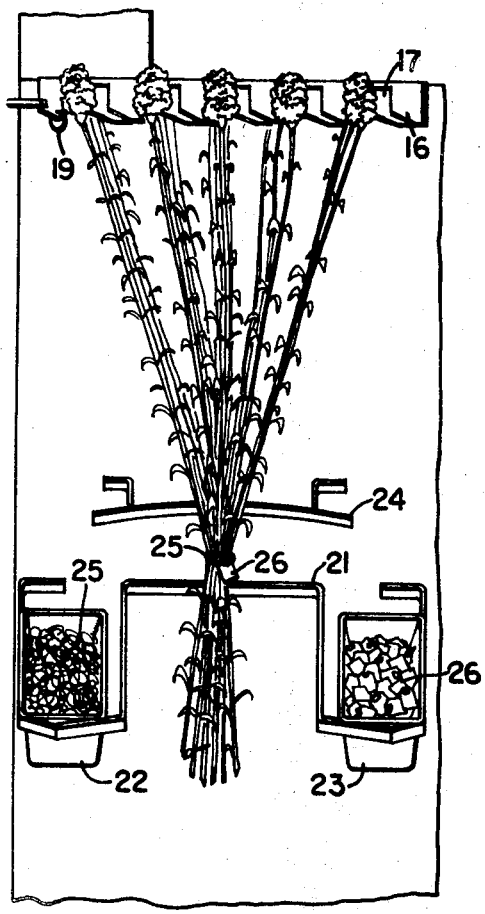
FIG_3
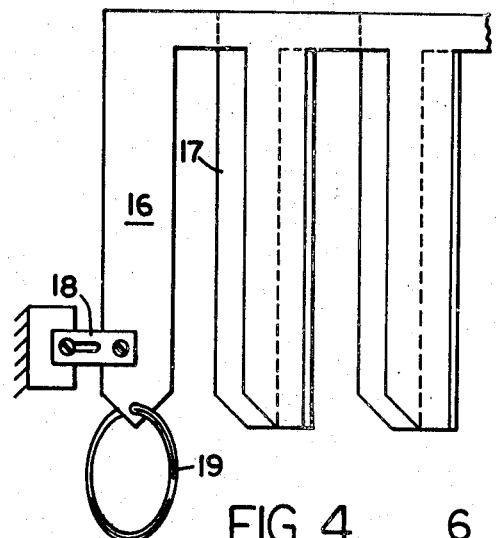
FIG_4
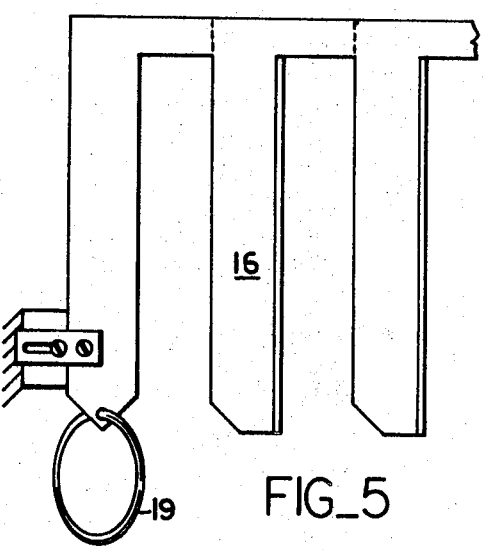
FIG_5
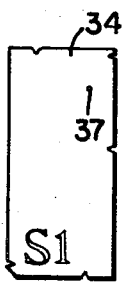
FIG_7
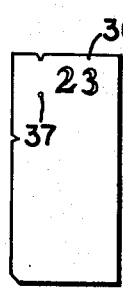
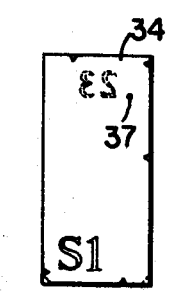
FIG_8
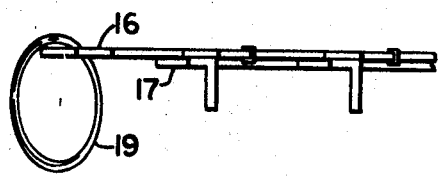
FIG_6
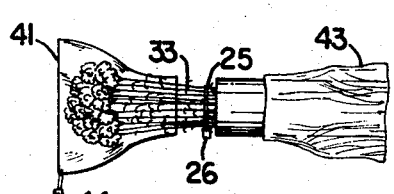
FIG_9
INVENTOR.
GERALD L. GREGOIRE
BY
*Fryer, Tjensvold, Feix Phillips and Lempio*
ATTORNEYS United States Patent Office 3,517,809
Patented June 30, 1970

3,517,809
CENTRAL GRADING SYSTEM FOR CUT FLOWERS
Gerald L. Gregoire, San Francisco, Calif., assignor to Gregoire Flowers, Inc., San Francisco, Calif., a corporation of California
Filed Dec. 3, 1968, Ser. No. 788,113
Int. Cl. B07c 7/00
U.S. Cl. 209—122
18 Claims

ABSTRACT OF THE DISCLOSURE

Ungraded cut flower material is graded and simultaneously formed in bunches by grades at one or more grading stations. Each grading station is equipped with a number of decision limiting racks and each rack corresponds to a different grade of flower.

---

This invention relates to methods and apparatus for processing cut flowers to produce graded flower bunches from ungraded cut flower material.

The production of cut flowers, particularly carnations, and subsequent shipment of the cut flowers to retail sales points has increased very substantially in recent years.

The cut flowers are sold by grades. With carnations, for example, there are six grades—selects, fancy, standard, shorts, splits, and heads. The selects are the top grade, and the other grades rank in the order listed. The top four grades—selects, fancy, standard, and shorts—are the money grades. These are the grades that are most profitable. The growers, wholesalers, and retailers therefore want to minimize the time required to process the other grades.

It is very important to a wholesaler to be able to consistently deliver properly graded flowers. The cost of inconsistency to the wholesaler is loss of customer confidence and the inability to build repeat business.

Inconsistency of grading also cost the retailer. The cost to the retailer is undependability of supply, excess cost in buying time, returned goods and outright losses. The retailer's time and effort could be spent more profitably in soliciting additional business and insuring satisfaction of his customer. But, the retailer's supply must be dependable, and the grades communicable. That is, "Select" must mean the same thing to shipper, wholesaler and retailer.

In the past, the flowers were picked in the greenhouse and graded by the grower before being shipped to a wholesaler. The grading was apt to be quite subjective. There would be differences in grading between different growers, and there would also be differences in grading from time to time by the same grower. The grading by the individual growers also required several handlings of the flowers by the grower. This, in turn, increased breaking and bruising.

It is a primary object of the present invention to grade cut flowers by a central grading system which eliminates or minimizes the problems of the prior art. It is a related object to produce a more dependable and consistent product.

The central grading system of the present invention minimizes handlings, provides product consistency, produces more equitable grower returns (rewarding quality) and achieves economies of scale.

It is a specific object of the present invention to use mechanical aids in a central grading system to help eliminate much of the subjectivity of grading. In the present invention fixed, decision limiting racks (with each rack corresponding to a different grade of flower) are disposed in front of a grader at each one of a number of grading stations. The racks keep all the flowers even. The racks include decision limiting guides for correctly judging the flower grade by stem length. The racks include tie point indicators for indicating the lower tie point for the stems of the flower bunch. The racks grade and simultaneously group the cut flowers in bunches by grade as the flowers are placed in the racks. Fixed, decision limiting racks constructed and operated in this way constitute further specific objects of the present invention.

It is a further specific object of the present invention to tie the stems in a new way with a rubber band and a one-way closure.

It is a further object of the present invention to integrate the grading and bunching operations in a processing system which includes a new stem tying technique as noted immediately above, and a color coding technique which provides quick visual recognition of the flower grade at all points in the process.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a side elevation view of two individual grading stations in one embodiment of the central grading system of the present invention;

FIG. 2 is an end elevation view taken along the line and in the direction indicated by the arrows 2—2 in FIG. 1;

FIG. 3 is a perspective view (from about the point of view of the grader) showing how the flowers are bunched and tied in a grade rack corresponding to one flower grade;

FIG. 4 is a fragmentary plan view looking down on the top of the racks shown in FIG. 2 and showing the racks in the position used for supporting the flowers during grading;

FIG. 5 is a view like FIG. 4 but showing the racks moved to a position in which the spacing between individual rack elements has been increased to facilitate removal of the flower bunch from the grade rack;

FIG. 6 is a view taken along the line and in the direction indicated by the arrows 6—6 in FIG. 4;

FIG. 7 is a view of two record cards—a grade card with an indication of an individual grader and a grower identification card—showing how each card is punched with an off center hole;

FIG. 8 is a view like FIG. 7 but showing the cards back-to-back with the off center holes aligned and illustrating the manner in which the off center hole assists in keeping the printed faces of the cards on the outside after the cards are assembled back-to-back; and FIG. 9 is an elevation view illustrating a final processing operation in the central grading system of the present invention.

In FIG. 1 individual grading stations constructed in accordance with the one embodiment of the present invention are indicated generally by reference numerals 11.

Ungraded cut flower material (in boxes 12) is conveyed to the grading stations 11 by a conveyor 13.

The ungraded cut flower material in the boxes 12 comes directly from individual growers.

A grader at each grading station takes the ungraded cut flower material and grades and simultaneously bunches the cut flower material in fixed, decision limiting racks. Each rack corresponds to a different grade of flower.

Thus, as best illustrated in FIG. 2, each grading station may have four racks disposed side by side in front of the grader. As illustrated in FIG. 2, the rack farthest to the left of the grader is the rack for the fancy grade. Adjacent to that rack is a rack for selects. And a rack for the standard grade is to the right of the rack for the selects. A rack for shorts is farthest to the right.

Grade indicator signs 14, giving head size and blossom size and other information regarding each particular grade, are mounted above the grade racks for that particular grade.

As best illustrated in FIGS. 3, 4, 5, and 6, each rack includes horizontally extending and laterally spaced support elements 16 and 17. The support elements engage the undersides of the flower heads to support the flowers while the flowers are being graded and bunched in the racks.

As illustrated in FIGS. 4, 5, and 6, the support elements 16 may be preferably mounted for movement with respect to the elements 17 so that the spacing between these elements can be increased after the bunch has been formed to facilitate removal of the bunch from the rack. In the form of the invention illustrated in FIGS. 4, 5, and 6, the elements 17 are mounted in a fixed position and the elements 16 are mounted for swinging action about some fixed pivots, as by a series of linkages 18. Pull rings 19 are associated with each rack to facilitate pulling the rack to and from the positions illustrated in FIGS. 4 and 5.

With continued reference to FIG. 3 the individual racks may preferably include guide means, (a bracket 21 arrangement as illustrated in FIG. 3) for positioning the lower end of the flower stems close together as the cut flowers are placed in the rack. These guide means also serve to help classify the flowers by stem length since the guide means indicate a minimum length for the stem length of flowers of that grade.

The bracket 21 also serves to hold a bin 22 for rubber bands and a bin 23 for one-way tab type fasteners for the rubber bands (as will be described in greater detail below).

Each rack may also include a tie point indicator (a curved back-up strip 24 as illustrated in FIG. 3) for indicating the lower tie point for the stems of that particular bunch.

After an individual rack (as illustrated in FIG. 3) has been substantially filled with that grade of cut flower, and after the upper support members 16 and 17 in combination with the lower guide 21 has caused the flowers in that rack to be bunched together, the lower ends of the stems of that bunch are tied in a unique manner with a rubber band 25 at the level indicated by the tie point indicator 24. The rubber band 25 is looped around the front of the bunch. While this is happening the curved strip 24 furnishes support on the back side of the bunch and helps to keep the stems centered in the rack. The two ends of the rubber band in back of the bunch are pressed between the split ends of a tab type locking closure 26. Once the ends of the rubber band are inserted within the locking closure, the closure 26 is effective to retain the ends of the rubber band within the closure and the stems are tied in a novel and effective manner.

In the prior art it was necessary to slip a rubber band up over the lower ends of the stems to the desired position or it was necessary to wrap string around the lower end of the bunch. Either operation was difficult and time consuming in comparison with the technique of the present invention.

At least some of the grade racks may preferably include a stop (a bar 27 as illustrated in FIG. 2) for limiting the stem length of a cut flower that can be included in that graded bunch in the rack. Thus, if the grader should attempt to place a cut flower F having a stem length S long enough to classify that cut flower as a flower in a higher grade in an improper grade for that cut flower, the stop 27 will immediately make it apparent that the flower has been improperly graded.

The support members for a particular flower grade are illustrated in the drawings as being at the same level. With some floral material it may be desirable to place the support members in the central part of the rack at a higher level than the support members at the ends of the rack so that the flower blossoms are arranged in an umbrella shape as the bunch is formed. The support members may also be staggered in heighth (e.g. a one up, one down, one up, one down relation) to produce a more compact grouping of the flower blossoms. These arrangements might be more advantageous in certain packaging or display applications. There is enough latitude in the permissible stem length of most flower grades to permit this slight offsetting of the level of some of the support members 16 and 17.

Referring back to FIG. 1, the central grading system of the present invention preferably includes a second conveyor 29 for conveying the flower bunches from the grading stations 11 to a shipping station. The conveyor 29 as shown in FIG. 1 is an overhead conveyor with a series of hooks 31 and 32.

The flower bunches 33, tied at the lower ends of their stems by the rubber band 25 as described above, are placed on hooks 31.

For record purposes a card indicating the grade of the flower bunch and a card indicating the particular grower are associated with each flower bunch 33. Thus, as illustrated in FIG. 7 a grade card 34 has a letter S indicating the select grade. In this particular instance the grade card 34 also has a number 1 indicating the particular grader.

A second card 36 bears the number 23 indicating a particular grower.

Each card is drilled with an off-center hole 37. When the cards 34 and 36 are put back-to-back with the grade indication and grower indication on the outside faces the holes 37 are aligned. The holes 37 will not line-up unless the numerical information on the cards is on the outside faces of the back-to-back cards.

As illustrated in FIG. 1 the cards 34 and 36 are then hooked on to hooks 32 through the aligned holes 37.

With reference to FIGS. 1 and 2 cards such as cards 34 and 36 may be stored in one or more bins 47 at each grading station.

A final stage in the preparation of the flower bunches 33 for shipment is illustrated in FIG. 9. A unitary plastic sleeve and blossom shield 41 having a champagne glass shape is used to grip the upper ends of the flower bunch below the blossoms and to shield the blossoms themselves. As illustrated in FIG. 9 the lower, tied ends of the flower bunch 33 may be inserted in an open end of a cylindrical member 42 and a plastic member 41 pulled from a nestled stack 43 up along the upper part of the stems. The reduced diameter sleeve portion grips the stems to, in effect, form a tie around the upper part of the stems.

An identifying label 44 is attached to the plastic member 41. The label 44 indicates the flower grade and may also indicate the wholesaler. The completely packaged and tied flower bunch 33 is then removed from the cylindrical member 42 and placed in a shipping container for shipment to a retailer.

In accordance with the present invention the tabs 26, grade and grower cards 34 and 36, and labels 44 are all color keyed in a manner such that each grade of flower has a separate, identifying color. Thus, the color for selects may be blue and the color for standards may be red. Using a separate color for each separate grade and associating this color with each of the members tabs members 26, cards 34 and 36 and labels 44 permits the grade of each flower bunch to be visually determined at every stage in the process.

What is claimed is:

1. A method of processing cut flowers to produce graded flower bunches from ungraded cut flower material and comprising conveying ungraded material to a grading station having a plurality of decision limiting racks, with each rack corresponding to a different grade of flower, taking cut flowers from the ungraded material and placing the cut flowers in the racks by grade, and simultaneously grouping the cut flowers in bunches by grade.

2. A method as defined in claim 1 wherein at least some of the grading racks have a stop for limiting the stem length of a cut flower that can be included in that graded bunch.

3. A method as defined in claim 1 wherein each rack has a tie point indicator for indicating the lower tie point of the flower bunch and including typing the flower stems at that tie point after the bunch has been formed in the rack.

4. A method as defined in any of claims 1–3 including tying each bunch with a rubber band looped around the front of the bunch in the rack and connected across the back of the bunch by a split-ended, flexible tab member whose split ends are shaped both to permit easy insertion of the rubber band ends between the tab member ends and to lock the rubber band ends between the tab member ends once the rubber band ends are inserted between the spilt ends of the tab member, whereby the bunch can be quickly tied without knots, without removing the bunch from the rack, and without the need to slip the rubber band up over the ends of the stems.

5. A method as defined in claim 1 wherein the racks have horizontally extending and laterally spaced support elements which engage the undersides of the flower heads to support the flowers while the flowers are being graded and bunched in the racks and including the step of increasing the lateral spacing between the support elements after the bunch has been formed to facilitate removal of the bunch from the rack.

6. A method as defined in claim 1 including tying the lower ends of the stems of a bunch after the bunch is formed in the rack, removing the tied bunch from the rack, and transporting the bunch to a shipping station.

7. A method as defined in claim 6 including pulling a one piece combined sleeve and blossom shield over the bunch with the sleeve portion shaped to provide a tie for the upper ends of the stems of the flower bunch just below the blossoms.

8. A method as defined in claim 6 including tying the bunch with a rubber band and locking tab member, placing a grower card and grade card with each bunch prior to transporting the bunch to shipping station, adding a label to the bunch, and color keying the tab member, grower and grade cards and label in a manner such that each grade of flower has a separate, identifying color.

9. A method as defined in claim 1 including conveying the ungraded material sequentially to a plurality of said grading stations, tying together the stems of each bunch before removing the bunch from its associated rack, then removing the bunch from the rack and then conveying all of the tied bunches to a shipping station.

10. Apparatus for simultaneously grading cut flowers and forming the graded flowers in bunches by grade and comprising, a plurality of decision limiting racks mounted in adjacent relation at a grading station with each rack corresponding to a different grade of flower, each rack having horizontally extending and laterally spaced support members for engaging the underside of the flower heads to support the flower while the flowers are placed in bunches in the rack.

11. The apparatus as defined in claim 10 including means for increasing the lateral spacing between the support members to facilitate removal of the bunch from the rack.

12. Apparatus as defined in claim 10 wherein all of the support members are at the same level in a rack.

13. Apparatus as defined in claim 10 wherein the support members in the central part of the rack are at a higher level than the support members at the end of the rack so that the flower blossoms are arranged in an umbrella shape as the bunch is formed.

14. Apparatus as defined in claim 10 wherein the support members are staggered in heighth to produce a compact grouping of the flower blossoms.

15. Apparatus as defined in claim 10 wherein each rack includes tie point indicators for indicating a point at which the lower ends of the stems are to be tied.

16. Apparatus as defined in claim 10 including guide means with each rack for positioning the lower ends of the flower stems close together as the cut flowers are placed in the rack.

17. Apparatus as defined in claim 10 wherein at least some of the racks include a stop for limiting the stem length of a cut flower that can be included in that graded bunch in the rack.

18. Apparatus as defined in claim 10 including a first conveyor for conveying ungraded flower material to the grading station and a second conveyor for conveying graded bunches from the grading station.

References Cited

UNITED STATES PATENTS

| | | | |
|---|---|---|---|
| 2,920,765 | 1/1960 | Royer | 209—122 X |
| 2,984,353 | 5/1961 | Slifer et al. | 209—125 |
| 3,327,942 | 6/1967 | Blume | 209—122 X |

ALLEN N. KNOWLES, Primary Examiner